Feb. 24, 1948.   C. P. DEIBEL ET AL   2,436,382
DRY CELL BATTERY OF THE FLAT TYPE
Filed July 17, 1943   2 Sheets-Sheet 1
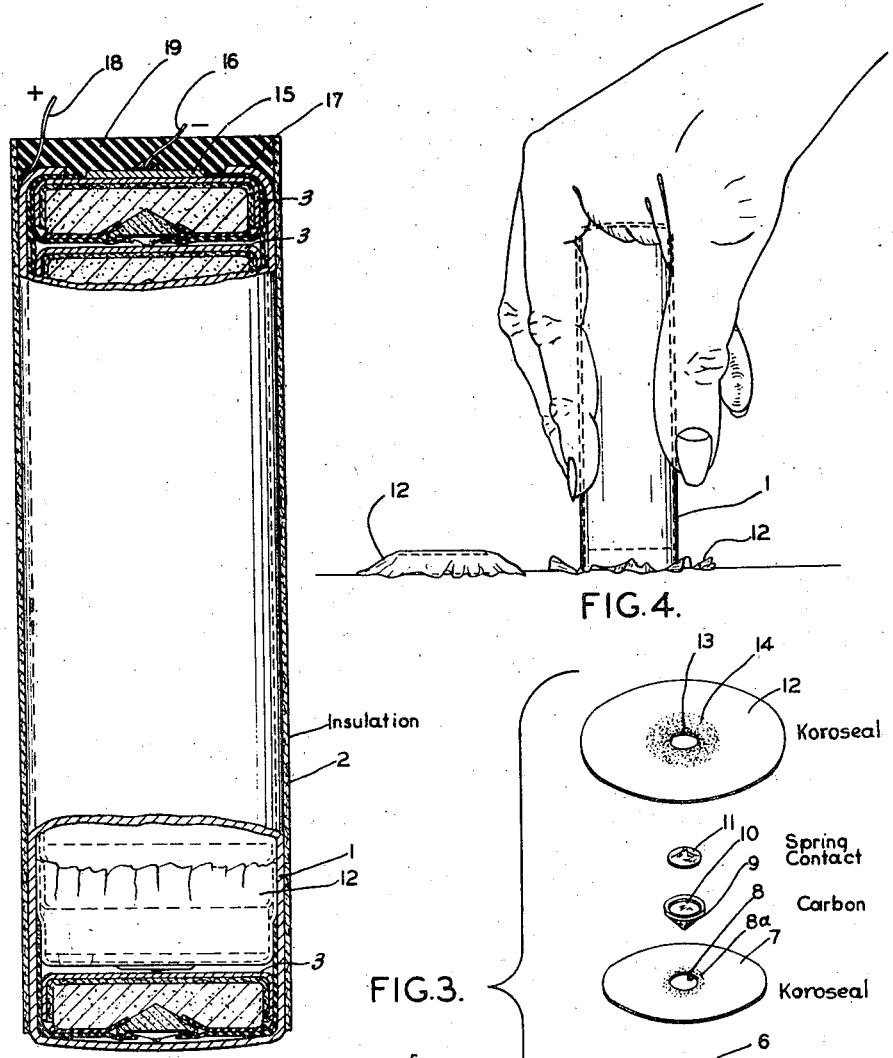
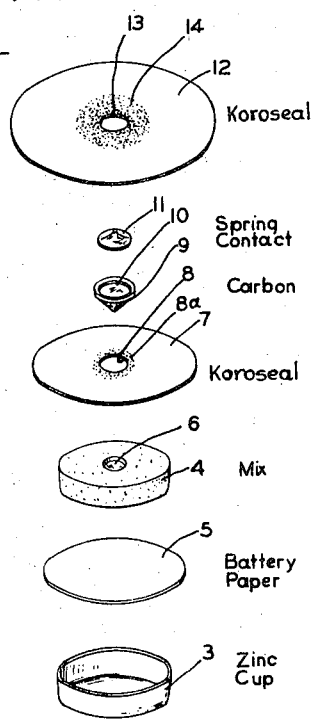
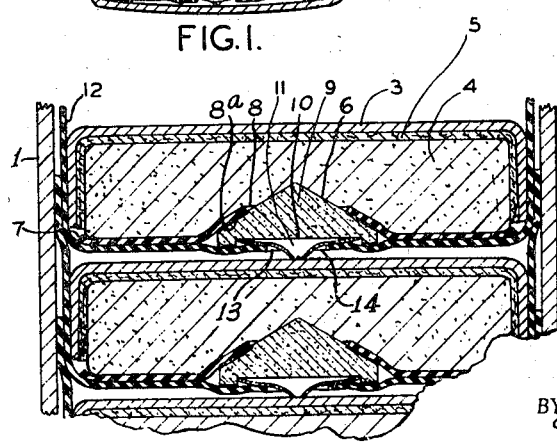
INVENTORS.
CYRIL P. DEIBEL, CLARENCE N. MERTE
and LEWIS A. GRAY
BY Fay, Gobrick, Chilton & Isler.
ATTORNEYS.

Feb. 24, 1948.  C. P. DEIBEL ET AL  2,436,382
DRY CELL BATTERY OF THE FLAT TYPE
Filed July 17, 1943   2 Sheets-Sheet 2

INVENTORS.
CYRIL P. DEIBEL, CLARENCE N. MERTES
and LEWIS A. GRAY
BY Fay, Golrick, Chilton & Isler
ATTORNEYS.

Patented Feb. 24, 1948

2,436,382

UNITED STATES PATENT OFFICE

2,436,382

DRY CELL BATTERY OF THE FLAT TYPE

Cyril P. Deibel, Lakewood, Clarence N. Mertes, Berea, and Lewis A. Gray, Lakewood, Ohio; said Mertes and said Gray assignors to said Deibel; Marion Thomas Deibel and The Cleveland Trust Company, executors of said Cyril P. Deibel, deceased, assignors to General Dry Batteries, Inc., a corporation of Ohio Application July 17, 1943, Serial No. 495,150

12 Claims. (Cl. 136—111)

This invention relates to a dry cell battery unit which is particularly well adapted for use with hearing aids, portable radios and the like where space is at a premium and where a substantially leak-proof battery is required.

One of the objects of the invention is to provide a dry cell battery unit of the character described which is made up of a plurality of separate small wafer-like individual cells which are arranged within an outer casing and connected in series and in which each individual cell is separately enclosed by a layer of insulating material which is preferably impervious to gases and liquids whereby to reduce to a minimum the danger of leakage of electrolyte.

A further object of the invention is to provide a dry cell battery unit of the character described which comprises essentially an outer casing containing a plurality of wafer-like cells arranged therein in stacked relation and connected in series, each cell comprising a zinc cup containing a mass of mix which receives therein the electrolyte and a carbon electrode which is embedded in the mass of mix and provided with a spring-like metallic conductor adapted to contact the zinc electrode of the next adjacent cell. The mass of mix is covered by a plurality of thin layers of insulating material which extend along the walls of each zinc cup so as to provide an effective seal between adjacent cells, the entire group of cells being held within the outer casing under pressure in intimate electrical contact.

Another object of the invention is to provide a dry cell battery unit having the above described distinguishing features and characteristics and which is simple in construction and well adapted for quantity production at a minimum cost.

Further and more limited objects of the invention will appear as the description proceeds and by reference to the accompanying drawings in which Fig. 1 is a view partly in section and partly in elevation of a dry cell battery unit embodying the features of our invention;

Fig. 2 is an enlarged fragmentary sectional view disclosing the details of construction of each individual cell;

Fig. 3 is a perspective view disclosing the sectional parts of the cell disassembled;

Fig. 4 is a view in elevation illustrating a manual method of assembling the cells within an outer casing;

Figure 6:
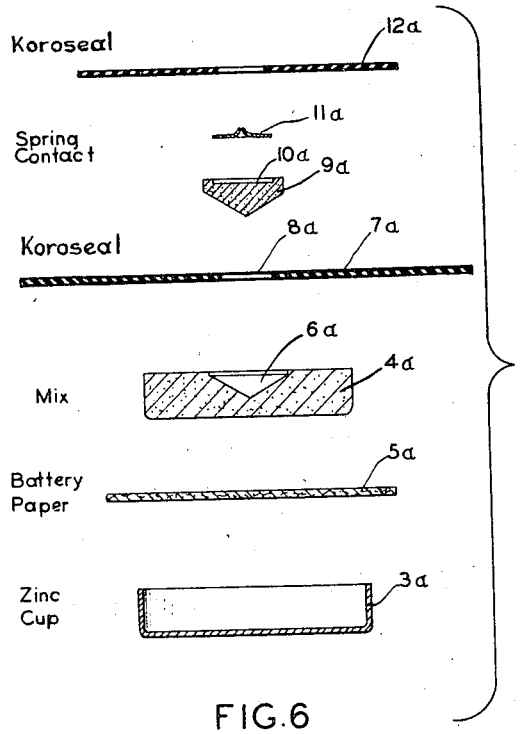
Fig. 6 is a disassembled view of a dry cell of the type embodied in the battery of Fig. 5, showing the several parts before assembly.

In the several forms of the invention herein disclosed it will be noted that each cell includes two thin layers of insulating material both of which are secured in liquid-tight sealed relation with the carbon electrode, one of such layers of sealing material serving to hold the metallic contact member in place with respect to the carbon electrode. In all forms of the invention disclosed there is at least one thin layer of insulating material which overlaps and extends along the side wall of an adjacent cell.

Referring now to the drawings, Figs. 1-4 inclusive, it will be seen that each battery unit comprises an outer casing 1, preferably formed of metal, which is enclosed within an insulating wrapper or casing 2. Each cell comprises a zinc cup 3 which receives therein a mass of mix 4 which is insulated from the zinc cup by means of a liner 5 of battery paper. Each mass of mix has a centrally disposed depression 6 therein. Disposed over each mass of mix is an insulating layer 7 which is preferably formed of Koroseal, although material having the characteristics of Koroseal may be used, such of Pliofilm, Cellophane, Vinylite, or the like. The layer of Koroseal 7 has a central opening 8 therein which receives therethrough a carbon buttton 9 which has a depression 10 in the top thereof. The reference character 11 designates a spring-like metallic conductor which is shown in section in Fig. 2.

According to one method of assembly, the liner 5 is first inserted into the zinc cup 3. The preformed mass of mix 4 is then inserted into the lined cup. The Koroseal layer 7 is then placed over the mass of mix having first been coated as shown at 8a adjacent the opening therein with a thin layer of adhesive, such as rubber cement, so that the adhesive is on the surface away from the mix. The carbon button 9 is next inserted and forced slightly into the depression 6 in the mass of mix and the adhesive forms a liquid and gas seal between the Koroseal and carbon. The spring contact member 11 is then placed within the recess 10 in the top of the carbon button. A second layer of insulating material 12 is then placed over the carbon button. This layer of insulating material is also preferably of Koroseal and has a central opening 13 therein and is coated on one side adjacent the opening with a thin layer of rubber cement or the like as indicated at 14, which cement adheres to the carbon and spring contact for forming a liquid and gas seal between these members and the Koroseal 12. The cell thus formed will now appear as shown at the left side of Fig. 4. The layers of insulating material are preferably quite thin, on the order of about two-thousandths of an inch. The first layer of insulating material 7 is preferably slightly smaller than the second layer and of sufficient length to overlie the mass of mix, as shown in Fig. 2. The second layer of insulating material 12 is considerably larger than the first layer and is of sufficient length to extend upwardly along the side walls of the next adjacent cup, as will appear from Fig. 1, although the sizes of the two insulating layers may be varied as desired.

The cells so formed are placed on a table or other flat surface, as indicated in Fig. 4. If the battery unit is to be assembled manually, the operator grasps the casing 1 in one hand, as shown in Fig. 4, and forces the open end of the same over each succeeding cell one after the other until the container is completely filled. This operation tends to fold the second layer of insulating material upwardly to the position shown in Figs. 1 and 2. After the casing has been completely filled with dry cells, a disk of terneplate 15 is placed over the bottom of the uppermost zinc cup, as shown in Fig. 1, and to which is soldered a terminal connection 16. The battery unit thus formed is then placed within a suitable fixture and the upper end thereof spun over inwardly, as indicated at 17. A terminal connection 18 is then soldered to the upper end of the metal casing 1. The metal casing 1 is then inserted within the outer carton or casing 2, which for safety may be in the form of a laminated kraft paper tube having interposed layers of asphalt. The outer carton is then sealed by means of a seal of suitable sealing material such as asphalt which is preferably poured on while hot so that the seal will bond firmly with both the outer carton and the container.

It will be noted that each individual cell is closed by two thin layers of insulating material which are secured to the carbon button and the spring contact member in liquid-tight relation so that the danger of leakage of electrolyte is reduced to a minimum.

The carbon button and the spring contact member are held in fixed relation to each other by the two layers of insulating material which are secured in liquid-tight relation by a suitable adhesive material.

Koroseal is a vinyl polymer type of synthetic rubber in rolled form. Vinylite is one of the group of synthetic resins made by the polymerization of vinyl compounds. Pliofilm is a hydrochlorinated rubber, that is, rubber to which hydrogen has been added. Koroseal and Pliofilm are both strong, somewhat stretchable, tear-resistant, acid resistant, and impervious to moisture and gas and resistant to oil and hydrocarbons and have the quality of being sealed by fusion when heat is applied thereto. Other material having the desirable qualities of Koroseal may, of course, be used.

Figure 5:
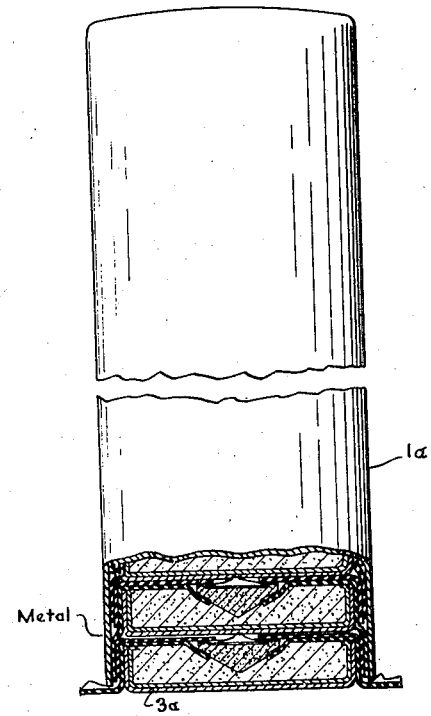
Fig. 5 is a view partly in section and partly in elevation showing a slightly modified form of dry cell battery unit partially assembled.

Figs. 5, 6, 7 and 8 of the drawings disclose a slightly modified form of the invention in which the position of the two layers of insulating material is reversed. In the cell disclosed in Fig. 8, component parts of which are shown in Fig. 6, there is provided a zinc cup 3a which contains a mass of mix 4a which is separated from the zinc cup by a liner of battery paper 5a. The carbon electrode 9a is disposed in a depression 6a in the mass of mix. A thin layer of insulating material 7a overlies the mix cake, extends along the side walls of the cup 3a and the cup 3a of the adjacent cell when the cells are assembled in the battery as shown in Fig. 5, and has a central opening 8a therein which receives the carbon electrode therethrough. The spring contact member 11a is disposed within a depression 10a within the carbon electrode and held in place by a thin layer of insulating material 12a which is preferably smaller than the material 7a. This layer may be composed of Koroseal or may be formed of Cellophane if desired.

Figure 7:
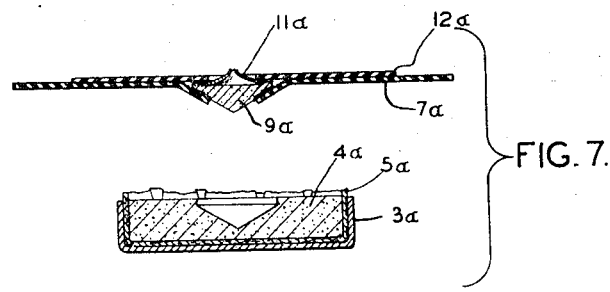
Fig. 7 is a partially assembled view of the dry cell parts illustrated in Fig. 6, showing a method of securing the carbon electrode and spring contact in place.
Figure 8:
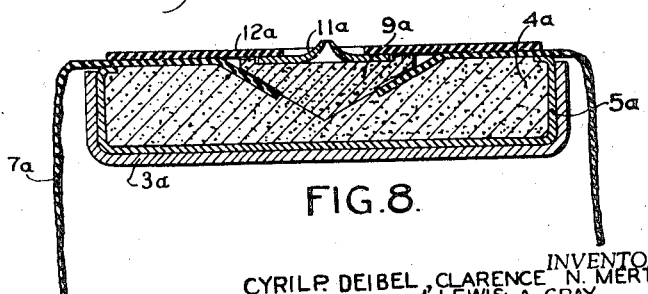
Fig. 8 is a vertical sectional view of a completed cell of the type embodied in the battery of Fig. 5.

The layer 12a may terminate adjacent the peripheral edges of the cup 3a as shown in Fig. 8 or may be extended beyond the edges over the layer 7a along the side walls of the cup 3a as shown in Fig. 5. The layers 7a and 12a are preferably secured together in the manner of the layers 7 and 12. As shown in Fig. 7 the two layers may be assembled with the carbon button 9a and spring contact 11a to provide the sub-assembly shown in the upper part of Fig. 7, which is assembled with the sub-assembly shown in the lower part of Fig. 7 to complete the cell. A plurality of cells may be assembled within a metal casing 1a as shown in Fig. 5. If desired, the metal container 1a may be enclosed within an insulating jacket such as the insulating jacket 2 shown in Fig. 1.

Other methods of forming and assembling the cells may of course be used. The individual cells may be of any desired size or shape. The construction herein described provides a very effective seal which reduces to a minimum the danger of leakage of electrolyte. The second insulating layer may be formed of Cellophane, if desired.

It will now be clear that we have provided a dry cell battery unit and a method of assembling the same which will accomplish the objects of the invention as hereinbefore stated. It will be understood that the embodiments of the invention herein disclosed are merely illustrative and are not to be considered in a limiting sense as the invention is limited only in accordance with the scope of the appended claims.

Having thus described our invention, what we claim is:

1. A dry cell battery unit comprising a plurality of cells arranged in stacked relation within an outer casing and connected in series and held in intimate electrical contact, each cell comprising a zinc cup containing a mass of mix, a carbon electrode, and a metallic conductor; a thin layer of insulating material extending over the mass of mix and secured in sealed engagement with said carbon electrode and having an opening therein through which the carbon electrode extends; and a second thin layer of insulating material extending over the mass of mix and along the side wall of the zinc cup and secured to said carbon electrode in sealed relation and having a centrally disposed opening therein, said carbon electrode and metallic conductor being secured between the two layers of insulating material in liquid tight relation.

2. A dry cell battery unit as set forth in claim 1 in which said layers of insulating material are impervious to gases and liquids.

3. A dry cell unit as set forth in claim 1 in which both of said layers of insulating material extend across said mass of mix.

4. A dry cell battery unit as set forth in claim 1 in which said second layer of insulating material extends over and engages the side wall of an adjacent cell.

5. A dry cell battery unit comprising a plurality of cells arranged in stacked relation within an outer container and connected in series, each cell comprising a zinc cup containing a mass of depolarizing mix wrapped in battery paper, a carbon electrode in each mass of mix and having one face thereof exposed, a thin layer of insulating material covering the exposed face of each mass of mix and having an opening therein through which said carbon electrode extends and having liquid-tight sealed engagement with said carbon electrode, a metallic contact member carried by said carbon electrode, and a second thin layer of insulating material extending over the top of said mix and carbon electrode and holding said contact member in place.

6. A dry cell battery unit comprising a plurality of cells arranged in stacked relation within an outer casing and connected in series and held in intimate electrical contact, each cell comprising a zinc cup containing a mass of mix insulated from said zinc cup, a carbon electrode, and a metallic conductor engageable with said carbon electrode; a thin layer of insulating material extending over the mass of mix and having an opening therein through which the carbon electrode extends, said insulating material being sealingly secured to said carbon electrode throughout an area surrounding said opening; and a second thin layer of insulating material extending over the first mentioned insulating material and having an opening therein, said second insulating layer being in engagement with said electrode throughout an area surrounding said opening therein, and said metallic conductor being engageable by said second layer of insulation adjacent the opening in said second layer for retaining said conductor in engagement with said electrode, said second layer of insulating material extending over the edges of said mix and intermediate said zinc cup and said outer casing.

7. A dry cell battery unit comprising a plurality of cells arranged in stacked relation within an outer casing and connected in series and held in intimate electrical contact, each cell comprising a zinc cup containing a mass of mix insulated from said zinc cup, and a carbon electrode, and a metallic conductor engageable with said carbon electrode; a thin layer of insulating material extending over the mass of mix and having an opening therein through which the carbon electrode extends, said insulating material being sealingly secured to said carbon electrode throughout an area surrounding said opening; and a second thin layer of insulating material extending over the first mentioned insulating material and having an opening therein, said second insulating layer being in sealed relation with said electrode throughout an area surrounding said opening therein, and said metallic conductor extending through said opening in said second layer of insulation and being sealingly secured to said second layer of insulation adjacent said opening for retaining said conductor in engagement with said electrode.

8. A dry cell battery unit as set forth in claim 5 in which one of the said layers of insulating material extends upwardly along the side walls of the next adjacent zinc cup.

9. In a dry cell unit comprising a plurality of cells arranged in stacked relation within an outer casing and connected in series and held in electrical contact, each cell comprising a zinc cup having a base portion and side walls, and containing a mass of mix separated from said zinc cup, a carbon button electrode of substantially less cross-sectional area than said cup and than said mass of mix and embedded in the surface of said mass of mix opposite the base of said zinc cup, and a resilient metallic conductor engaging said carbon electrode and separated from said mix and adapted to contact the exterior of the base of the zinc cup of the adjacent cell; the improvement which comprises a wrapping composed of a thin sheet of flexible insulating material impervious to the electrolyte of the cell, extending along the side walls of said zinc cup, across said mass of mix and overlying the edge portions of said carbon electrode and said metallic conductor, said wrapping having an opening through which a portion of said metallic conductor projects to engage said base of the zinc cup of the adjacent cell, the portion of said wrapping extending across said mix and overlying the edges of said carbon electrode preventing contact between the zinc cup, mix and carbon electrode of the cell with which it is associated and said zinc cup of the adjacent cell.

10. The structure defined in claim 9 wherein the wrapping extends along the side walls of the zinc cup of a cell disposed adjacent the base of the zinc cup of the cell with which the wrapping is associated.

11. The structure defined in claim 9 wherein the portion of the wrapping surrounding the opening therein is cemented to the carbon electrode.

12. The structure defined in claim 9 wherein the carbon electrode has an annular flange defining a recess in the outer surface thereof, the metallic conductor being disposed in said recess and the wrapping engaging said annular flange.

CYRIL P. DEIBEL.
CLARENCE N. MERTES.
LEWIS A. GRAY.

REFERENCES CITED

The following references are of record in the file of this patent:

UNITED STATES PATENTS

| Number | Name | Date |
|---|---|---|
| 2,144,574 | MacCallum | Jan. 17, 1939 |
| 1,283,765 | Wilhelm et al. | Oct. 29, 1918 |
| 2,307,765 | Deibel | Jan. 12, 1943 |
| 2,307,764 | Deibel et al. | Jan. 12, 1943 |
| 2,307,770 | Deibel | Jan. 12, 1943 |
| 2,307,761 | Deibel | Jan. 12, 1943 |
| 2,307,762 | Deibel | Jan. 12, 1943 |
| 2,270,185 | Dulmage | Jan. 13, 1942 |